(12) United States Patent
Nadel et al.

(10) Patent No.: US 12,091,159 B2
(45) Date of Patent: Sep. 17, 2024

(54) FLOW CONTROL DUCTED FANS

(71) Applicant: The Boeing Company, Arlington, VA (US)

(72) Inventors: Adam Nadel, Vienna, VA (US); Nikola Baltadjiev, Boston, MA (US); Anthony Prete, New Market, MD (US); Brian Whipple, Washington, DC (US)

(73) Assignee: The Boeing Company, Arlington, VA (US)

( * ) Notice: Subject to any disclaimer, the term of this patent is extended or adjusted under 35 U.S.C. 154(b) by 5 days.

(21) Appl. No.: 18/158,102

(22) Filed: Jan. 23, 2023

(65) Prior Publication Data

US 2024/0246661 A1 Jul. 25, 2024

(51) Int. Cl.
| | |
|---|---|
| *B64C 21/08* | (2023.01) |
| *B64C 11/00* | (2006.01) |
| *B64C 21/02* | (2006.01) |
| *B64C 29/00* | (2006.01) |

(52) U.S. Cl.
CPC ............ *B64C 21/08* (2013.01); *B64C 11/001* (2013.01); *B64C 21/025* (2013.01); *B64C 29/0033* (2013.01); *B64C 2230/20* (2013.01)

(58) Field of Classification Search
CPC ......... B64C 29/0033; B64D 2033/0286; F02C 7/042
See application file for complete search history.

(56) References Cited

U.S. PATENT DOCUMENTS

| | | | | |
|---|---|---|---|---|
| 3,058,693 | A | * 10/1962 | Doak ................. | B64C 29/0033 244/53 B |
| 3,222,863 | A | 12/1965 | Klees et al. | |
| 3,664,612 | A | * 5/1972 | Skidmore et al. ..... | B64D 33/02 137/15.1 |
| 2013/0099065 | A1* | 4/2013 | Stuhlberger ......... | B64U 30/297 903/902 |
| 2016/0229532 | A1 | 8/2016 | Shapery | |
| 2017/0158341 | A1* | 6/2017 | Kawai ..................... | F01D 17/16 |
| 2017/0284296 | A1* | 10/2017 | Nestico .................... | F02C 3/14 |
| 2018/0057150 | A1* | 3/2018 | Cheung ................. | B64D 33/04 |

FOREIGN PATENT DOCUMENTS

| | | |
|---|---|---|
| DE | 29916203 U1 | 10/2000 |
| EP | 3402718 B1 | 12/2022 |

OTHER PUBLICATIONS

Reel et al., "Using Computational Fluid Dynamics to Generate Complex Aerodynamic Database for VTOL Aircraft," 2018 Applied Aerodynamics Conference, Jun. 25-29, 2018, AIAA Aviation Forum, 13 pages.
European Patent Office, "Extended European Search Report," issued in connection with European Application No. 23210796.1, May 14, 2024, 7 pages.

* cited by examiner

*Primary Examiner* — Philip J Bonzell
*Assistant Examiner* — Ashesh Dangol
(74) *Attorney, Agent, or Firm* — HANLEY, FLIGHT & ZIMMERMAN, LLC

(57) ABSTRACT

Flow control ducted fans are disclosed. A disclosed example flow control apparatus for use with an aircraft includes a duct defining an inner cavity with a primary flow path, a fan disposed in the inner cavity, an aperture on an exterior surface of the duct and upstream from the fan, the aperture fluidly coupled to the inner cavity to define a secondary flow path, and a door to control a degree to which the aperture is opened.

22 Claims, 11 Drawing Sheets

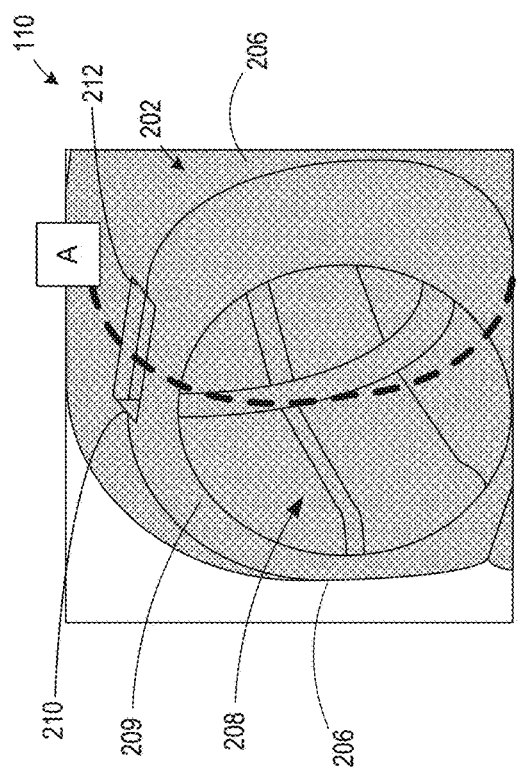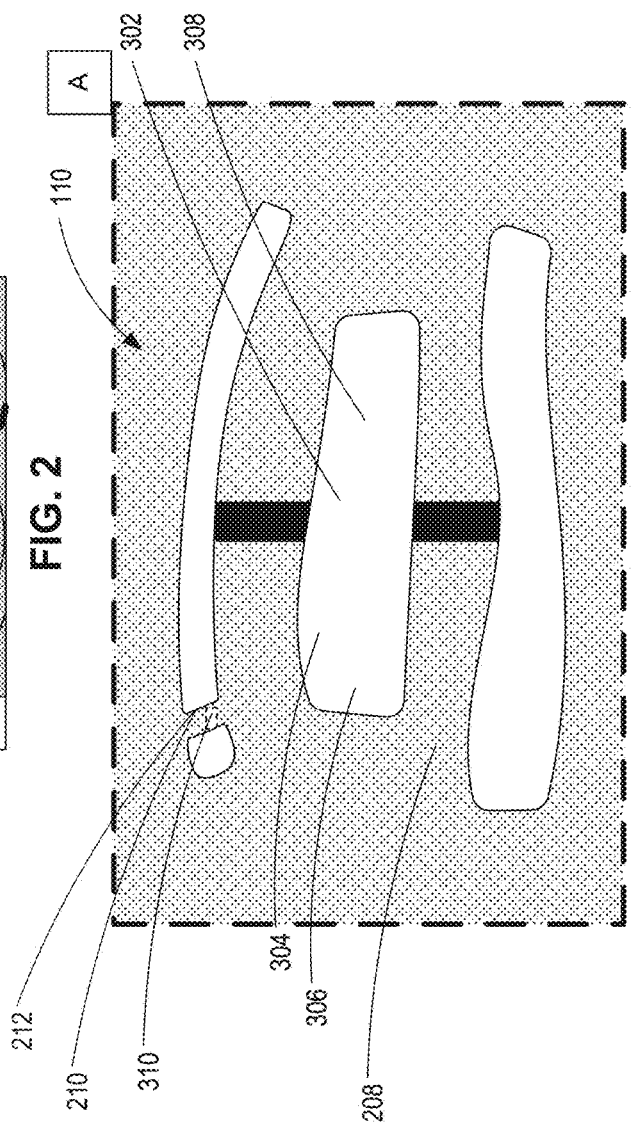

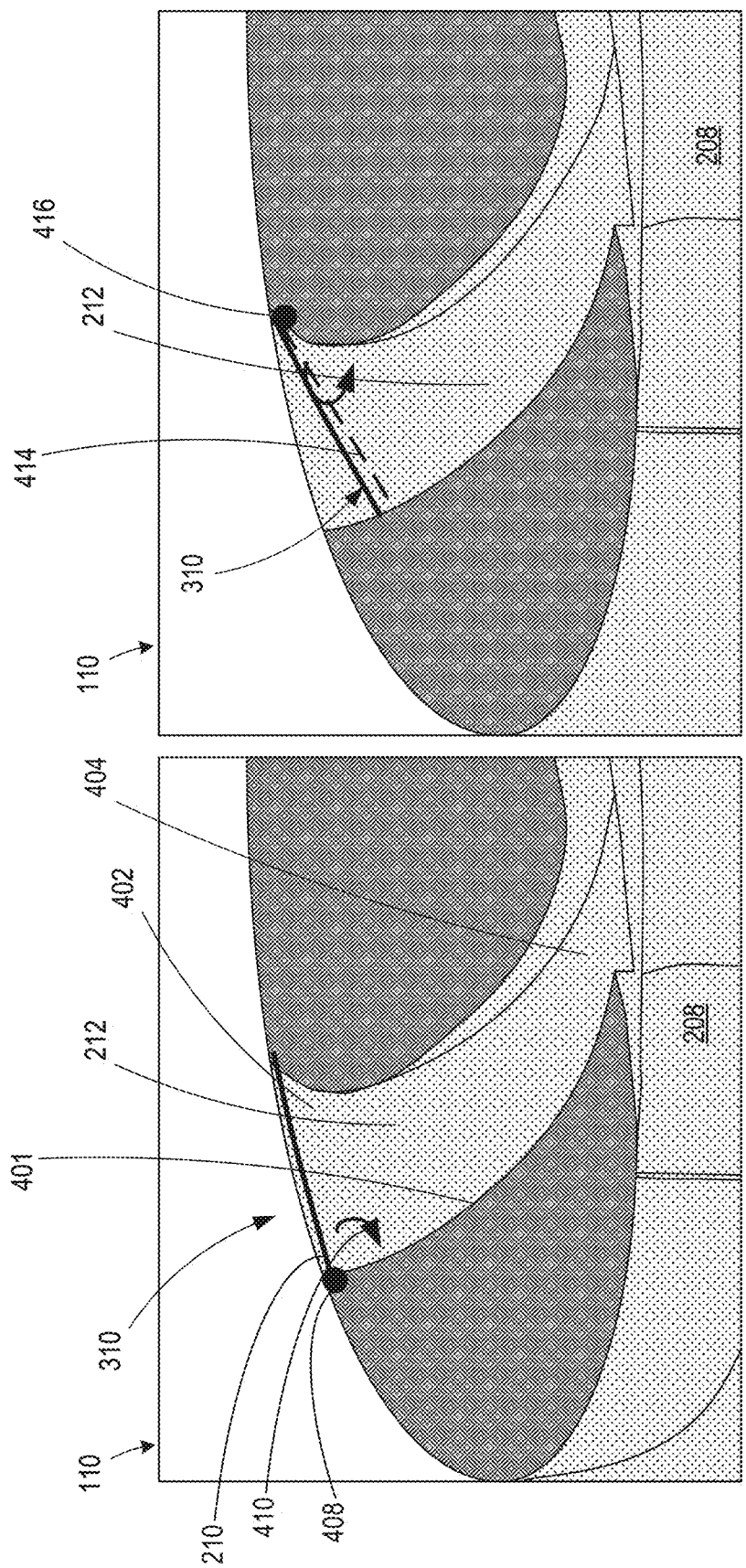

FLOW CONTROL DUCTED FANS

FIELD OF THE DISCLOSURE

This disclosure relates generally to aircraft propulsion and, more particularly, to flow control ducted fans.

BACKGROUND

In recent years, aircraft have implemented ducted fan systems that are distinct to open rotor implementations. These ducted fan systems can be advantageous in vertical take-off and landing (VTOL) aircraft. However, ducted fans can be prone to issues including flow separation and fan inlet distortion in certain conditions, such as a high angle of attack or certain crosswind conditions. These issues are typically mitigated with a design of a duct inlet lip. Accordingly, tilting duct systems that operate in both hover and forward cruise flight regimes can necessitate an inlet design that results in compromised fan performance. Alternatively, active flow control devices, such as fluidic oscillators or pulsating jets, can be used to improve the flow over ducted fans for certain conditions.

SUMMARY

An example flow control apparatus for use with an aircraft includes a duct defining an inner cavity with a primary flow path, a fan disposed in the inner cavity, an aperture on an exterior surface of the duct and upstream from the fan, the aperture fluidly coupled to the inner cavity to define a secondary flow path, and a door to control a degree to which the aperture is opened.

An example method for supplementing a primary flow path of a propulsive fan of an aircraft includes operating the fan such that a primary flow path flows through an inner cavity defined by a duct in which the fan is positioned, and at least partially opening an aperture on an external surface of the duct and upstream of the fan to enable a secondary flow path to flow into the inner cavity from the aperture.

An example non-transitory machine readable storage medium comprising instructions that, when executed, cause processor circuitry to at least determine at least one of a flight condition or a flight mode associated with an aircraft, and cause, based on the determined at least one of the flight condition or the flight mode, an aperture of a duct defining an inner cavity with a fan disposed therein to at least partially open to reduce flow separation associated with the duct.

BRIEF DESCRIPTION OF THE DRAWINGS

FIG. 2 is a detailed view of an example ducted fan in accordance with teachings of this disclosure.

FIG. 3 is a cross-sectional view of the example ducted fan of FIGS. 1A and 2 shown along a plane A of FIG. 2.

FIGS. 4A and 4B are detailed cross-sectional views of the example ducted fan of FIGS. 1A-3.

Figure 1A:
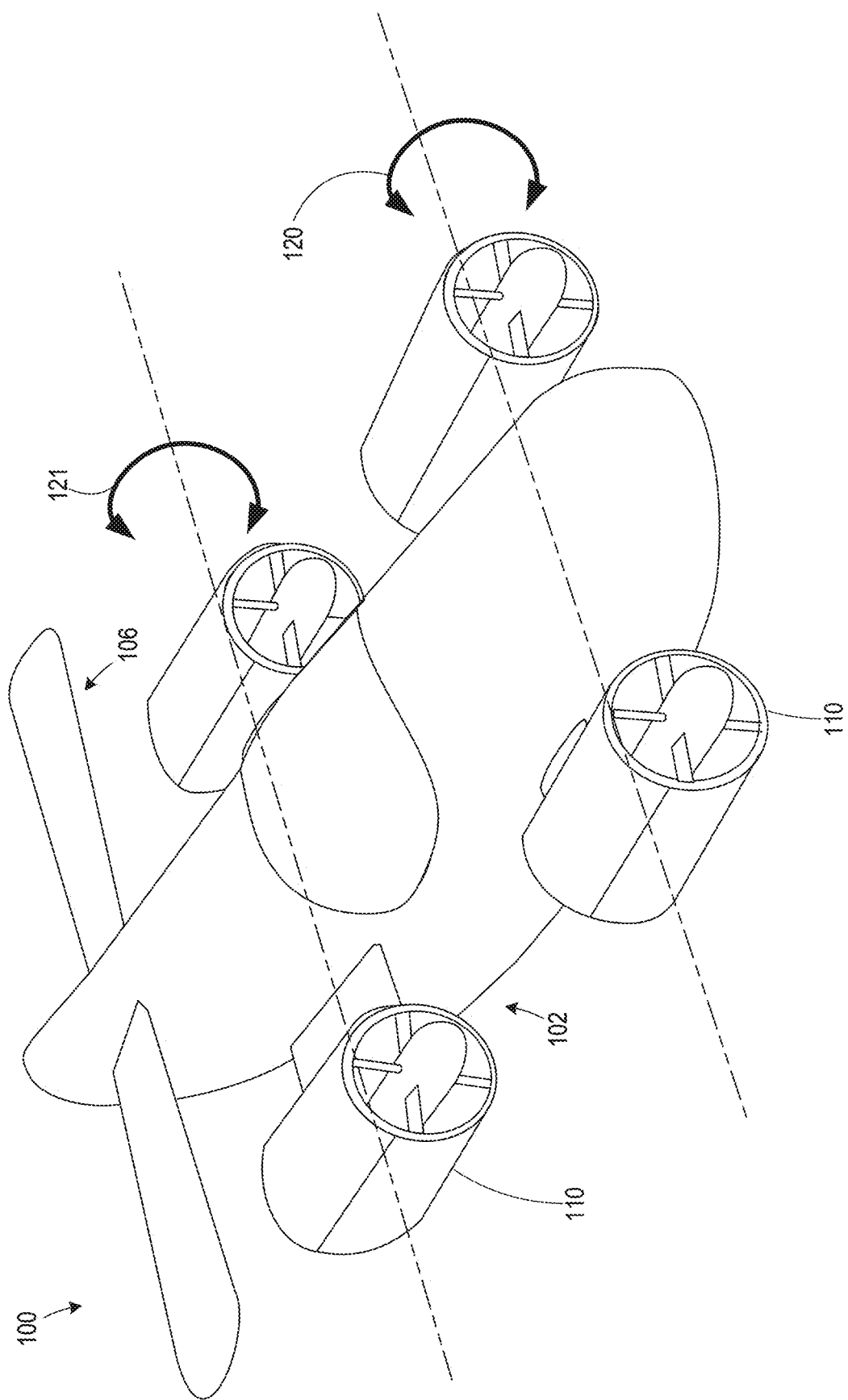
FIG. 1A is an aircraft in which examples disclosed herein can be implemented.

In general, the same reference numbers will be used throughout the drawing(s) and accompanying written description to refer to the same or like parts. The figures are not to scale. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Flow control ducted fans are disclosed. In recent years, aircraft have implemented ducted fan systems that are distinct from open rotor implementations. However, ducted fans can be prone to issues including flow separation and fan inlet distortion in certain conditions, such as a high angle of attack or certain crosswind conditions.

For ducted fans that are usually implemented in tilt-wing aircraft, an efficient shape of the inlet may not be axisymmetric. In particular, relatively thinner profiles are more efficient in forward flight and thicker profiles are preferred in near hover and transition flight regimes to allow the flow to turn into a duct. However, sides of the duct that include relatively thinner profiles can be prone to flow separation and distortion when the free stream is coming from that side of the duct. Examples disclosed herein can reduce impacts of these negative flow phenomena by introducing a secondary flow path into the duct with a controllable opening and/or aperture. For example, a slot and/or channel that is variably closed/opened by a movable flap or door can be implemented on an exterior of the duct.

Examples disclosed herein utilize a controlled aperture in a ducted fan of an aircraft to control operational performance of the fan and, in turn, the aircraft in different scenarios. In particular, the aperture is located on an external surface of a duct that defines a primary flow path (e.g., a primary flow path by which fluid flows along a longitudinal direction of the duct) of an inner cavity (e.g., a plenum) of the duct. In turn, the aperture, which is upstream and/or positioned toward a leading direction of the fan, can at least be partially opened to enable a secondary flow path to enter the inner cavity via a channel that fluidly couples the aperture to the inner cavity. When a flap or door that covers aperture is open, the secondary flow path provides additional flow into the areas of an inlet of the fan where separation may occur, thereby maintaining attachment of the flow and, thus, improving overall fan performance.

In some examples, the aforementioned scenarios used to determine whether the aperture is open, closed and/or partially open can correspond to whether the aircraft is in a hover/VTOL mode or a cruise mode. Particularly, flow characteristics associated with ducted fans are typically mitigated by geometric design of a duct, which can be limited in maintaining desired flow characteristics across different flight modes and/or flight conditions. In contrast, examples disclosed herein enable highly adaptable flow control of a ducted fan by controlling the aperture of the ducted fan. In some examples, the aperture can be generally shaped as a slot that is opened or closed based on a flight mode of the aircraft. Examples disclosed can enable increased efficiency and reduced power consumption based on controlling flow characteristics of ducted fans through opening and closing of the aperture.

In some examples, the aperture, which can be shaped as a slot extending laterally across at least a portion of the duct, is fluidly coupled to an inner chamber or cavity of the duct via a channel (e.g., a fluid channel). In some such examples, the channel is curved and extends between a respective inlet at a fore location to a corresponding outlet at an aft location. Additionally or alternatively, the channel includes a converging cross-sectional profile between its corresponding inlet and outlet.

As used herein, the term "duct" refers to a housing or other structure defining an inner cavity such that the structure extends in an overall direction that is at least partially aligned to an outlet/inlet direction of a fan or other flow generating device. As used herein, the term "ducted fan" refers to a propulsive fan that is positioned within and/or assembled with a duct. As used herein, the term "flight mode" refers to an operational mode of an aircraft that is selectable and/or changeable. As used herein, the term "flight condition" refers to a condition that affects overall operation of an aircraft. As used herein, the term "primary flow path" refers to a flow path that is generally routed from a primary inlet of a duct to a primary outlet of a duct. Accordingly, the term "secondary flow path" refers to a flow path fluidly coupled to an inner cavity, but not routed to the inner cavity from either the primary inlet or the primary outlet.

FIG. 1A is an aircraft 100 in which examples disclosed herein can be implemented. The aircraft 100 of the illustrated example includes a fuselage 102, and a rear/aft portion 106. Further, the example aircraft 100 includes ducted fans (e.g., ducted fan assemblies) 110.

In operation, the aircraft 100 is implemented as a VTOL aircraft such that the aircraft 100 can be switched between a hover mode (e.g., a hovering mode, a takeoff mode, etc.), and a cruise mode (e.g., a primary flight mode, a cruising mode, etc.), as shown and described below in connection with FIG. 1B below, moving, rotating and/or orienting the ducted fans 110. Accordingly, operation and/or running characteristics of the ducted fans 110 can vary when the aircraft 100 is in different operational modes. In particular, flow separation and power usage, amongst other parameters, can vary significantly between the different modes. In other examples, a wing or other aerodynamic body holding the fan(s) 110 is rotated to move between flight modes.

To place the example aircraft 100 in the hover mode or the cruise mode, the ducted fans 110 (and/or an aerodynamic body coupled thereto) can rotate relative to the fuselage 102, as generally indicated by a double arrows 120, 121. While the aircraft 100 is a VTOL aircraft in this example, examples disclosed herein can be implemented on any other aircraft including, but not limited to, fixed wing aircraft, short takeoff and landing (STOL) aircraft, rotorcraft, aircraft with fan arrays, etc. Further, examples disclosed herein can be implemented in other types of manned or unmanned vehicle including, but not limited to, hovercraft, watercraft, submersibles, spacecraft, etc.

In some examples, the ducted fans 110 are arranged in arrays (e.g., on a wing). In some particular examples, the ducted fans 110 are placed on wings or other aerodynamic bodies. Additionally or alternatively, multiple ones of the ducted fans 110 are placed on a wing, but separated by a distance (e.g., staggered along the distance instead of being adjacent to one another).

Figure 1B:
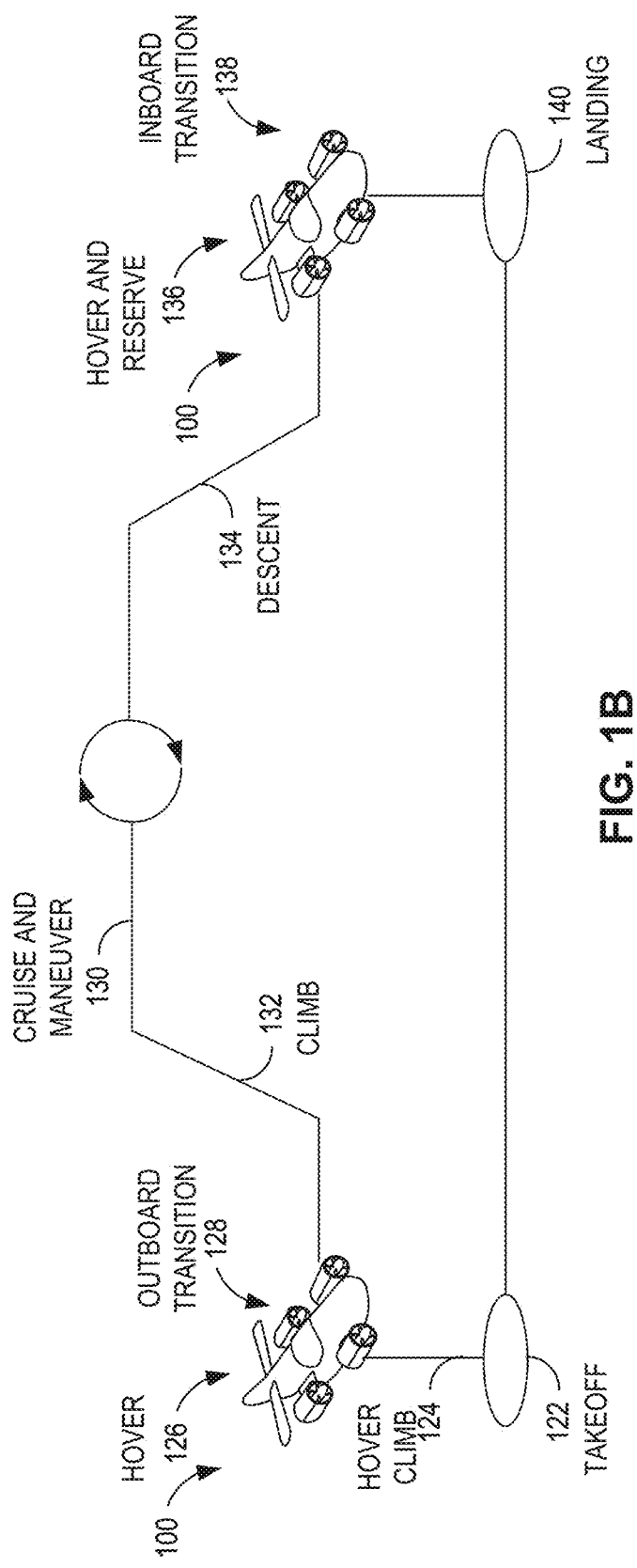
FIG. 1B illustrates example segments of a flight controlled using a thrust vectoring system according to one or more examples described herein.

FIG. 1B illustrates the segments of an example flight for the example aircraft 100. The example flight of FIG. 1B includes vertical takeoff 122, hovering 126 (e.g., loitering, hover climb 124); transitioning 128 between vertical flight and cruise; cruising 130; in flight climbing 132; descent 134, hovering 136 for landing; transitioning 138 between the hovering 126 and vertical landing 140; and vertical landing 140. In one or more examples, a thrust vectoring system directs the thrust 114 for all the segments of the flight (e.g., with the ducted fans 110). In some examples, an additional propulsor (e.g., a propeller) providing additional thrust assists/adds thrust during the cruising 130, for example. In some examples, the thrust vectoring system is primarily utilized for the transitioning 128, vertical takeoff 122, and the vertical landing 140 segments but not generally utilized for forward cruise 130 powered by additional thrust. Thus, a power level and/or vectoring of the aircraft 100 is controlled in accordance with the segments of flight and/or a presence of additional propulsors or lift generating surfaces.

FIG. 2 is a detailed view of the example ducted fan 110 in accordance with teachings of this disclosure. In the illustrated example of FIG. 2, the ducted fan 110 includes a housing (e.g., a duct, a nacelle, a plenum structure, etc.) 202 which, in turn, includes side walls 206. In this example, the walls 206 define an inner cavity or chamber 208. The example housing 202 also includes an inlet lip 209 adjacent, proximate and/or including an aperture 210, which is associated with a door 310 (shown in FIG. 3) and implemented as a slot (e.g., a slot channel, a lateral slot, etc.) with a corresponding channel (e.g., a curved channel, a fluid channel, a converging channel, etc.) 212.

To control and/or vary flow characteristics of the ducted fan 110, a degree to which the slot 210 is opened or closed is controlled. As a result, operational characteristics of the ducted fan 110 are adjusted. In particular, a degree of flow separation encountered by the ducted fan 110 can be controlled (e.g., reduced) in different flight modes and/or transitionary flight modes, thereby enabling improved operation of the ducted fan 110 by adapting operation of the ducted fan 110 for different operational flight modes, flight conditions and/or propulsion operational modes. In this example, the door 310 shown in FIG. 3 is moved to fully open or fully closed states/positions of the slot 210. However, in some other examples, the door 310 is controlled to partially open/close the slot 210. In other words, some examples disclosed herein control a size of an opening of the slot 210.

In some examples, a degree to which the slot 210 is opened or closed is based on a measured airspeed (e.g., an airspeed measured within the slot 210 and/or the channel 212). In some such examples, the degree to which the slot 210 is opened is proportional (e.g., linearly proportional) to the airspeed. In some examples, the door 310 is closed when a forward speed of the aircraft 100 meets or exceeds a threshold forward speed of the aircraft. In some examples, the channel 212 is not axisymmetric.

FIG. 3 is a cross-sectional view of the example ducted fan 110 of FIGS. 1A and 2 (shown along a plane A of FIG. 2). In the illustrated example of FIG. 3, the ducted fan 110 includes a fan (e.g., a fan propeller, a fan assembly, a fan blade, a fan module, a propulsive fan, etc.) 302, a fan assembly 304 with a leading edge portion (e.g., a leading edge cone) 306 and a trailing edge portion 308 in the inner chamber 208, and the slot 210 with the aforementioned door 310.

In this example, the slot 210 is opened during VTOL operations pertaining to takeoff, hovering, transitions (e.g., hovering/cruise transitions) and/or landing, thereby causing a secondary flow to flow to the inner chamber 208 along with a primary flow that flows in a general direction of left to right (as viewed in FIG. 3). Accordingly, the slot 210 is closed with the door 310 during primary flight and/or cruise of the aircraft 100. Additionally or alternatively, a degree to which the slot 210 is opened or closed by the door 310 is based on a tilt angle of the ducted fan(s) 110.

FIGS. 4A and 4B are detailed cross-sectional views of the example ducted fan 110 of FIGS. 1A-3. Turning to FIG. 4A, the example channel 212 is shown with the door 310 depicted in a closed position. In particular, no secondary flow is introduced via the channel 212 while a primary flow moves through ducted fan 110 (e.g., during a cruise mode, when the aircraft 100 exceeds a forward speed threshold, etc.).

To facilitate entry of fluid into the chamber 208 as a secondary flow when the slot 210 is opened via the door 310, the channel 212 exhibits a generally swept back curved shape profile 401 (i.e., curved in at least two directions in the view of FIG. 4A) with an inlet 402 and an outlet 404. In particular, the inlet 402 of the example channel 212 is positioned at a leading edge portion (e.g., a leading edge side) while the outlet 404 is at a trailing edge portion (e.g., a trailing edge side) of the example channel 212 that corresponds to a secondary inlet of the chamber 208. However, any other shape and/or cross-sectional profile can be implemented instead. For example, the channel 212 can extend between the inlet 402 and the outlet 404 with relatively straight walls (e.g., an uncurved shape profile). Additionally or alternatively, a cross-sectional opening size of the channel 212 converges and/or reduces along a direction from an external surface of the ducted fan 110 to the chamber 208. In other words, the channel 212 can become narrower as it approaches the chamber 208, for example. In other examples, the channel 212 expands as it approaches the chamber 208.

To move the door 310 between open and closed positions (or partially opened/closed positions), the door 310 pivots about a rotational joint 408, as generally indicated by an arrow 410. In particular, the door 310 can swivel and/or rotate about the rotational joint 408 toward the chamber 208 (e.g., by an actuator or other movement device). In other examples, the door 310 can rotate to be at least partially positioned external to and/or away from an external surface of the ducted fan 110.

FIG. 4B depicts the example ducted fan 110 with the door 310 shown in an open position (e.g., a fully open position, a partially open position, etc.), which is generally depicted by a line 414. As a result, fluid (e.g., air) is caused to flow from the channel 212 and into the chamber 208. In this example, the door pivots about a pivot 416 (e.g., via a pivoting action) which, in contrast to the example of FIG. 4A, is at an aft direction from the channel 212. In some other examples, the door 310 includes multiple segments that, as a whole, resemble window blinds with multiple movable, slidable and/or rotatable panels.

Figure 5:
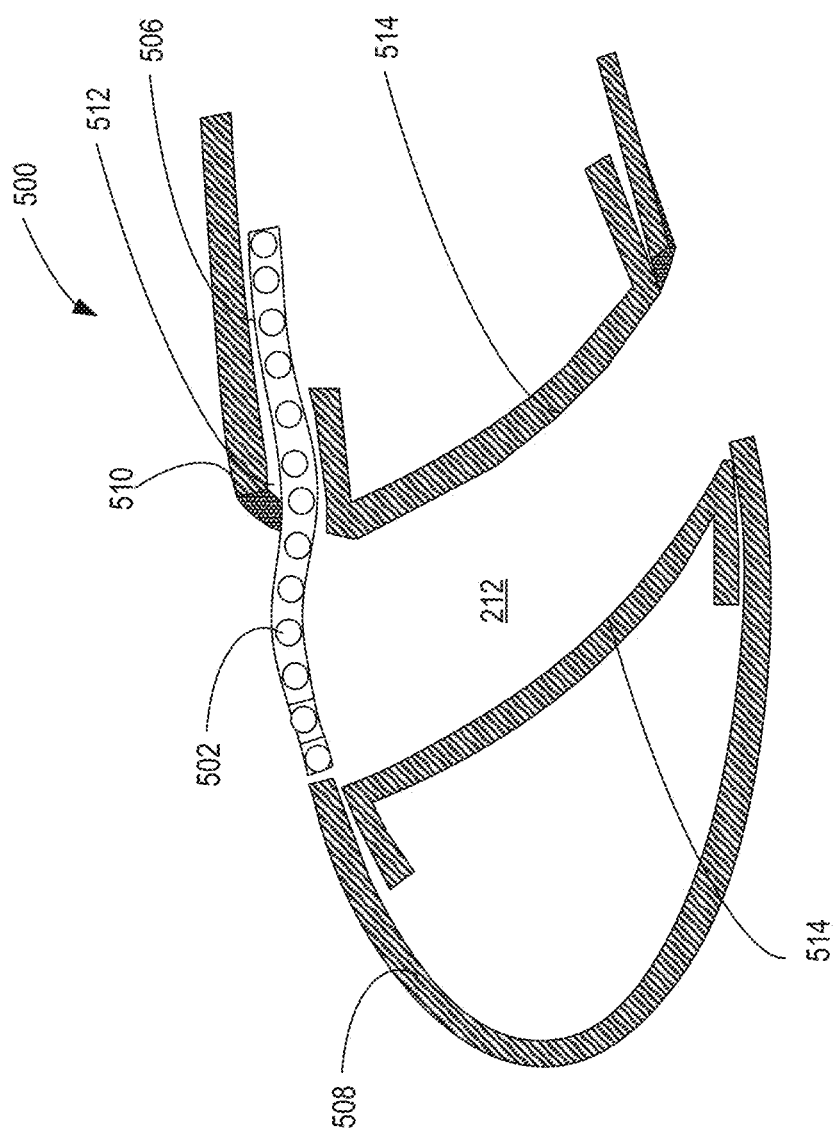
FIG. 5 is a cross-sectional view of an alternative example door that can be implemented in examples disclosed herein.

FIG. 5 is a cross-sectional view of an alternative example door 500 that can be implemented in examples disclosed herein. In this example, the door 500 is a slidable assembly that includes linkages 502 enclosed by a pliable cover and/or panel 506. In particular, the example door 500 (or portions thereof) can move, slide (e.g., via a sliding action), bend and/or rotate between wing skins 508, 510 for opening and closing thereof. In some examples, the door 500 can be inserted into and/or guided by an opening 512. In some such examples, the opening 512 can be implemented so that the door 500 can be at least partially folded (e.g., fully folded) as the door is moved away from the channel 212. In some examples, the opening 512 is generally slot shaped. However, any appropriate opening geometry and/or shape can be implemented instead. For example, the opening 512 can have a shape that is generally ellipsoid, rectangular, triangular, hexagonal, curved, etc.

In some examples, a duct structure (e.g., a duct wall) 514 is implemented to define the channel 212. In some such examples, the duct structure 514 is implemented to at least partially constrain and/or align the door 500. Additionally or alternatively, the duct structure 514 is implemented to define and/or limit a range of movement of the door 500. Additionally or alternatively, the door 500 can be closed or open by a rolling motion.

Figure 6:
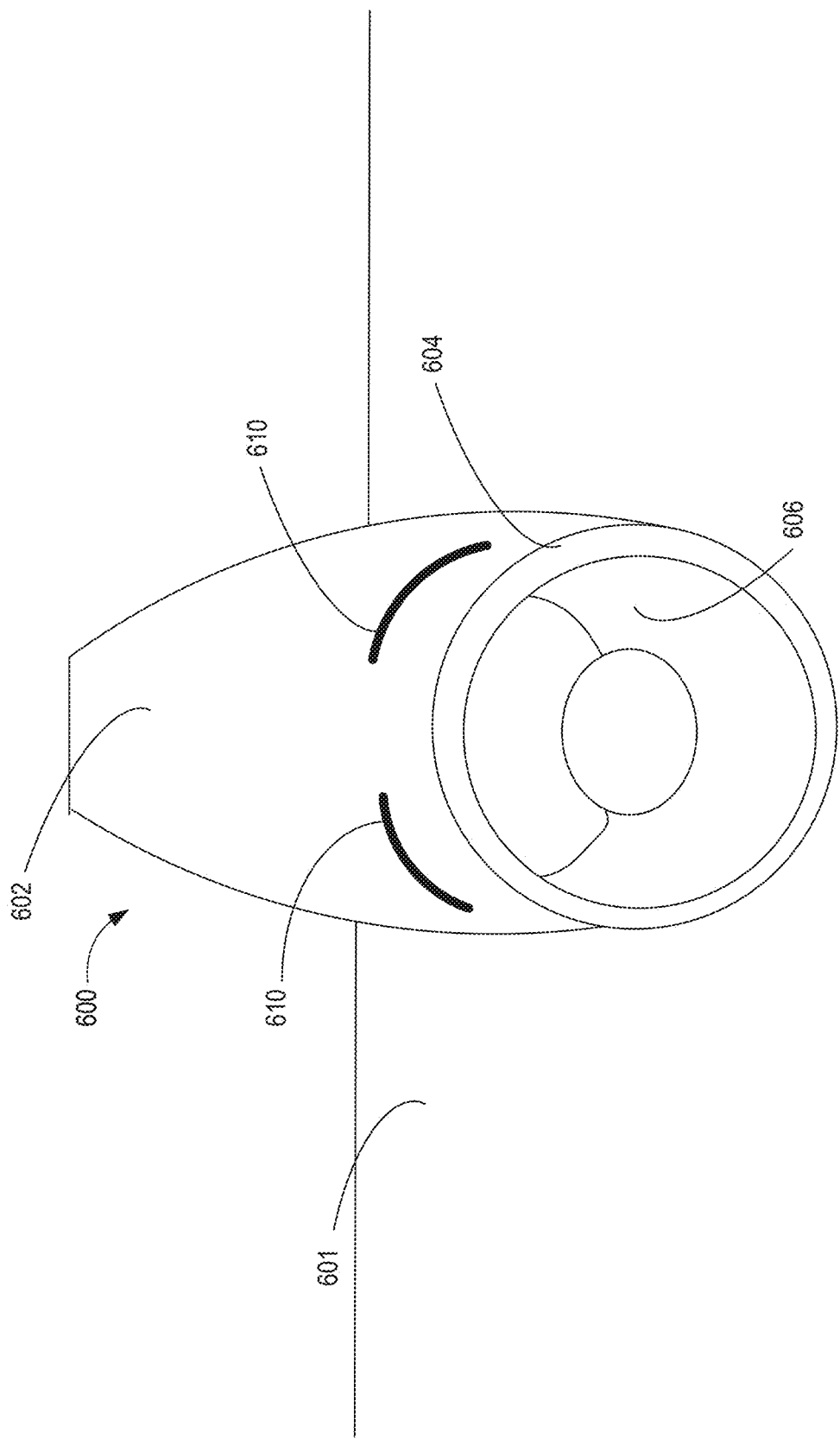
FIG. 6 is a top frontal view of an alternative example ducted fan in accordance with teachings of this disclosure.

FIG. 6 is a top frontal view of an alternative example ducted fan 600 in accordance with teachings of this disclosure. In this example, the ducted fan 600 is generally shaped with a circular and/or ellipsoid cross-sectional profile, and can be rotated. In some examples, the ducted fan 600 is positioned on a wing 601 or other aerodynamic body. The example ducted fan 600 includes a duct 602 with an inlet opening 604 that defines an inner cavity or chamber 606. The ducted fan 600 of the illustrated example includes controllable slots 610 that spaced at regular angular intervals along a circumference of the fan 600. For example, three of the slots 610 are spaced apart at 120 degree intervals from one another. In other examples, two of the slots 610 are spaced apart at 180 degree intervals from one another.

In operation, the slots 610 can be opened and closed to control a secondary flow being provided to the chamber 606. In particular, an opening or closing of the example slots 610 can be controlled based on flight conditions and/or an operational flight mode of a corresponding aircraft. In some other examples, the slots 610 can be partially opened to control a degree to which the secondary flow enters the chamber 606 (in addition to a primary flow moving therethrough). In this example, the slots 610 are opened or closed by a motion of a respective door (not shown) moving in a fore or aft direction. Alternatively, the slots 610 can be opened or closed with a lateral opening motion at their respective centers or lateral ends thereof.

Any aspects described above in connection with FIGS. 1A-6 can be combined with any other aspect and/or feature described therein. Further, any other appropriate geometries and/or shapes can be implemented instead. Examples disclosed herein can also be applied to any appropriate type of vehicle.

Figure 7:
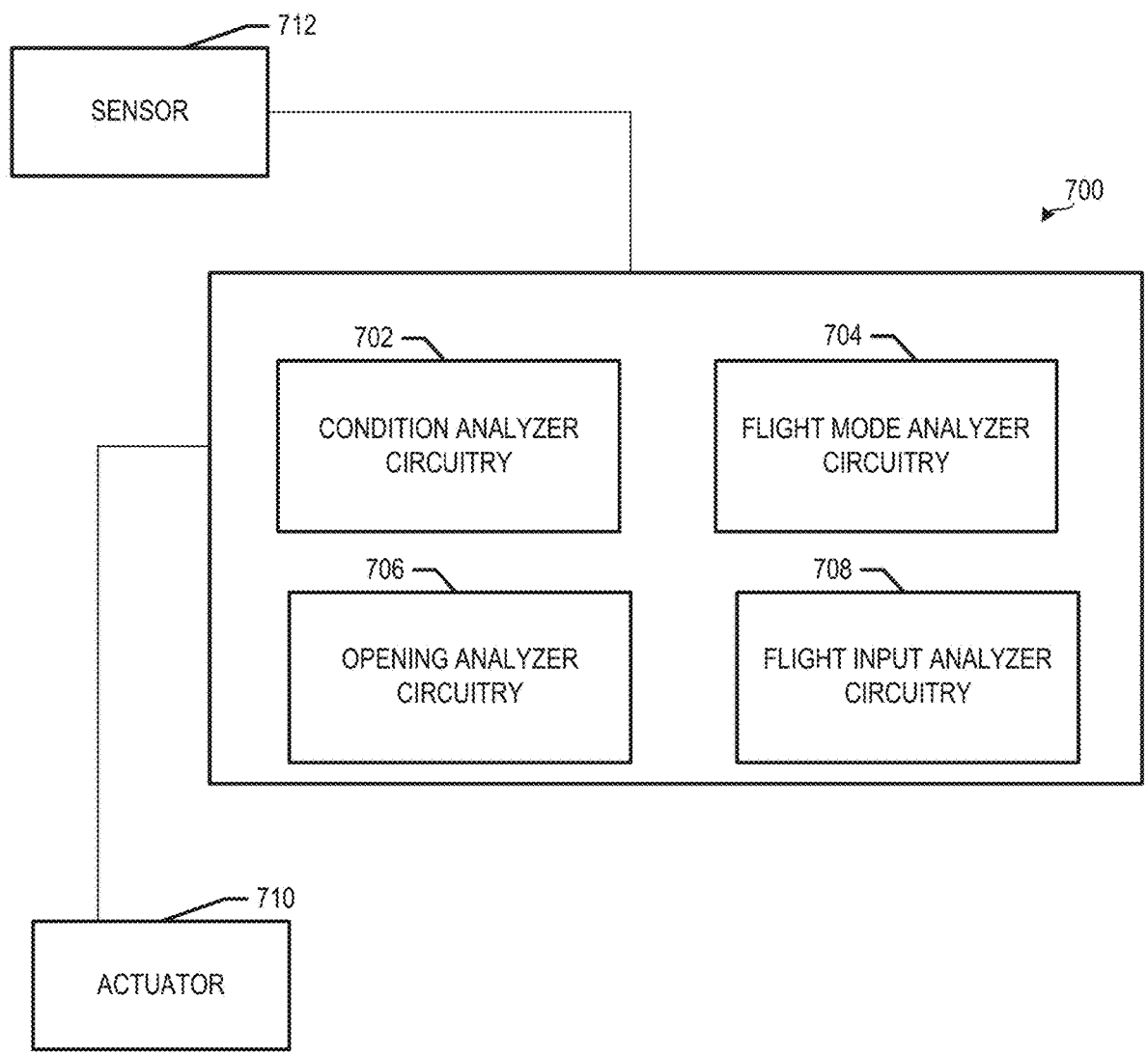
FIG. 7 is a block diagram of an example ducted fan control system that can be implemented with examples disclosed herein.

FIG. 7 is a block diagram of an example ducted fan controller 700 to control operation of at least one ducted fan (e.g., the fan 110). The ducted fan controller 700 of FIG. 7 may be instantiated (e.g., creating an instance of, bring into being for any length of time, materialize, implement, etc.) by processor circuitry such as a central processing unit executing instructions. Additionally or alternatively, the example ducted fan controller 700 of FIG. 7 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 7 may, thus, be instantiated at the same or different times. Some or all of the circuitry may be instantiated, for example, in one or more threads executing concurrently on hardware and/or in series on hardware. Moreover, in some examples, some or all of the circuitry of FIG. 7 may be implemented by microprocessor circuitry executing instructions to implement one or more virtual machines and/or containers.

The example ducted fan controller 700 includes example condition analyzer circuitry 702, example flight mode analyzer circuitry 704, an example opening analyzer circuitry 706 and an example flight input analyzer circuitry 708. In this example, the ducted fan controller 700 is communicatively coupled to an actuator 710 and/or a sensor 712. In some examples, the actuator 710 is implemented to control, move, close and/or open a door (e.g., the door 310, the door 500) associated with a slot of a ducted fan.

In some examples, the condition analyzer circuitry 702 is implemented to determine at least one condition (e.g., an external condition) corresponding to an aircraft (e.g., the aircraft 100). The at least one condition can correspond to an airspeed, a pressure, a flow characteristics measured, etc. by the sensor 712 and corresponding to a ducted fan (e.g., the ducted fan 110, the ducted fan 600, etc.). However, any other appropriate conditions can be implemented instead. In some examples, the condition analyzer circuitry 702 is instantiated by processor circuitry executing condition analyzer instructions and/or configured to perform operations such as those represented by the flowchart of FIG. 8.

The flight mode analyzer circuitry 704 of the illustrated example is utilized to determine a flight mode of the aircraft. For example, the flight mode analyzer circuitry 704 determines whether the aircraft is in a takeoff/landing/VTOL mode or a cruise/flight mode. Additionally, the flight mode analyzer circuitry 704 determines whether the aircraft is operating in a high-efficiency flight mode. Additionally or alternatively, the flight mode analyzer circuitry 704 determines a flight mode of the aircraft based on a relative position of one or more components (e.g., a rotation of a wing relative to a fuselage, a rotation of a ducted fan relative to a fuselage, etc.). In some examples, the flight mode analyzer circuitry 704 is instantiated by processor circuitry executing flight mode analyzer instructions and/or configured to perform operations such as those represented by the flowchart of FIG. 8.

The example opening analyzer circuitry 706 is implemented to control a degree of an opening and/or closing of the aforementioned slot. In some examples, the opening analyzer circuitry 706 controls the actuator 710 to move and/or displace a door (e.g., the door 310, the door 500) based on at least one of the condition and/or the flight mode. Additionally or alternatively, the opening analyzer circuitry 706 controls a degree to which the actuator 710 causes the slot to be partially closed/open. In some examples, the opening analyzer circuitry 706 coordinates opening/closing (e.g., partially opening/closing) multiple ones of the slots (e.g., some of the slots are closed while others are kept open). In some examples, the opening analyzer circuitry 706 is instantiated by processor circuitry executing opening analyzer instructions and/or configured to perform operations such as those represented by the flowchart of FIG. 8.

In some examples, flight input analyzer circuitry 708 is implemented to control an opening/closing of the slot based on flight input. The flight input can correspond to provided physical inputs from a pilot or control inputs of an unmanned aerial vehicle (UAV). In some examples, the flight input analyzer circuitry 708 is instantiated by processor circuitry executing flight input analyzer instructions and/or configured to perform operations such as those represented by the flowchart of FIG. 8.

While an example manner of implementing the ducted fan controller 700 of FIG. 7 is illustrated in FIG. 7, one or more of the elements, processes, and/or devices illustrated in FIG. 7 may be combined, divided, re-arranged, omitted, eliminated, and/or implemented in any other way. Further, the example condition analyzer circuitry 702, the example flight mode analyzer circuitry 704, the example opening analyzer circuitry 706, the example flight input analyzer circuitry 708, and/or, more generally, the example ducted fan controller 700 of FIG. 7, may be implemented by hardware alone or by hardware in combination with software and/or firmware. Thus, for example, any of the example condition analyzer circuitry 702, the example flight mode analyzer circuitry 704, the example opening analyzer circuitry 706, the example flight input analyzer circuitry 708, and/or, more generally, the example ducted fan controller 700, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example ducted fan controller 700 of FIG. 7 may include one or more elements, processes, and/or devices in addition to, or instead of, those illustrated in FIG. 7, and/or may include more than one of any or all of the illustrated elements, processes and devices.

Figure 8:
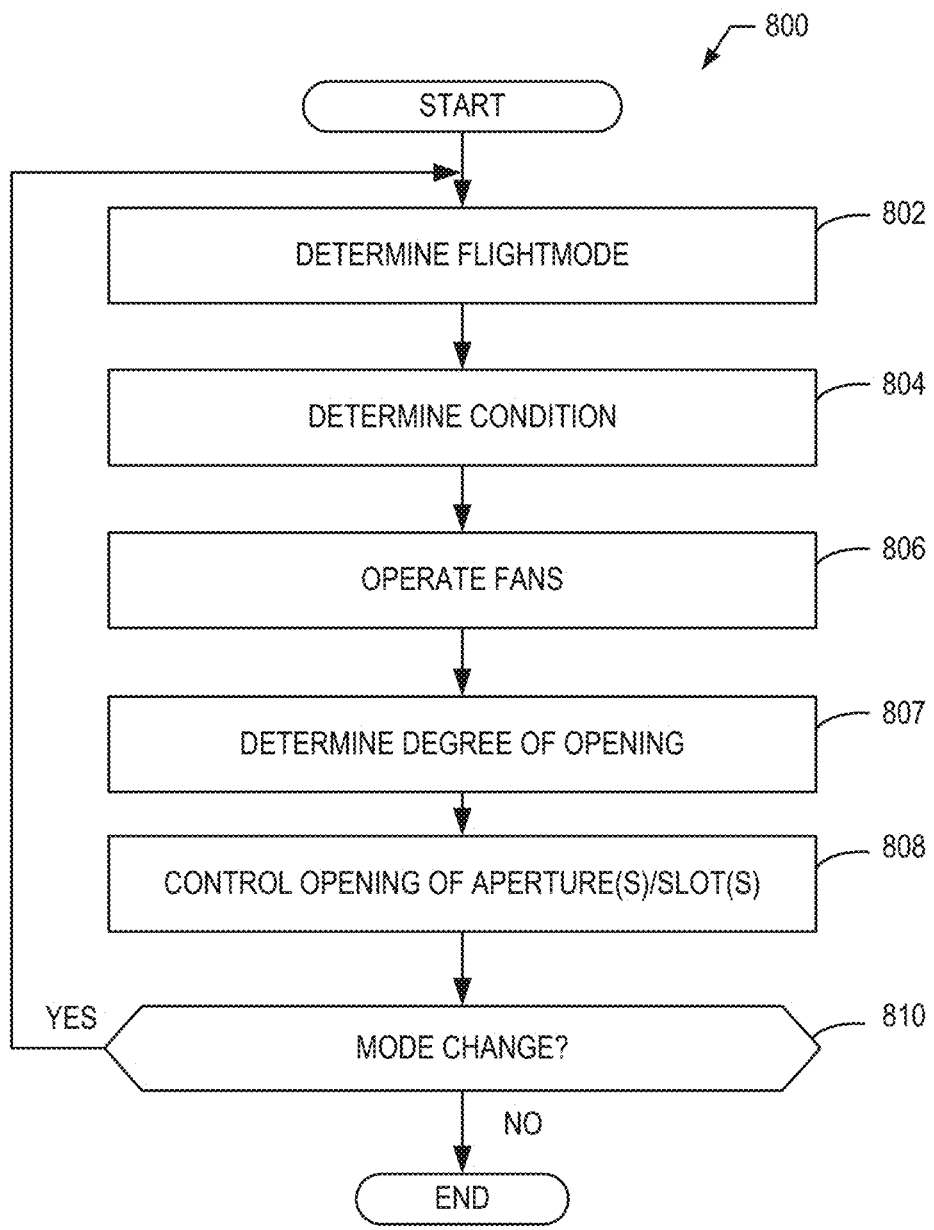
FIG. 8 is a flowchart representative of example machine readable instructions and/or example operations that may be executed by example processor circuitry to implement the example ducted fan control system of FIG. 7

A flowchart representative of example machine readable instructions, which may be executed to configure processor circuitry to implement the ducted fan controller 700 of FIG. 7, is shown in FIG. 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 8, many other methods of implementing the example ducted fan controller 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry to control operation of at least one opening of a ducted fan (e.g., the ducted fan 110). The machine readable instructions and/or the operations 800 of FIG. 8 begin at block 802, at which the example flight mode analyzer circuitry 704 determines a mode (e.g., a flight mode, an operational mode, etc.) is determined. The mode may be a hover, transition and/or cruise mode. Additionally or alternatively, a relative position/tilt (e.g., of a wing or other rotating aerodynamic body relative to a fuselage) corresponding to an aircraft (e.g., the aircraft 100) is determined by the example flight mode analyzer circuitry 704.

At block 804, in some examples, the condition analyzer circuitry 702 determines a condition of the aircraft. The condition may be determined based on information and/or data from the sensor 712, for example. In some examples, the condition can pertain to an airspeed, a speed of travel of the aircraft 100, pressure conditions, external wind conditions, etc.

At block 806, the example opening analyzer circuitry 706 and/or the example flight input analyzer circuitry 708 causes at least one ducted fan to be operated (e.g., for VTOL operation, for cruise, hover, etc.).

At block 807, in some examples, the example opening analyzer circuitry 706 determines a degree to which at least one slot of the ducted fan is to be opened. According to examples disclosed herein, the degree to which the slot is to be opened can be a partial opening of the at least one slot.

At block 808, the opening analyzer circuitry 706 of the illustrated example controls opening of the at least one slot of the ducted fan based on the mode and/or the condition. In some examples, the opening of the at least one slot is based on the determined degree to which the at least one slot is to be opened. In some examples, the opening analyzer circuitry 706 controls a degree to which the slot is opened (e.g., partially opened, fully opened, fully closed). According to examples disclosed herein, the at least one slot is opened during a hover and/or transition mode (e.g., hover to cruise mode, cruise to hover mode, etc.).

At block 810, the example flight mode analyzer circuitry 704 and/or the example condition analyzer circuitry 702 determines whether the aircraft has undergone a change in mode (e.g., from hover/VTOL operations to cruise or vice-versa). Additionally or alternatively, the example flight mode analyzer circuitry 704 and/or the example condition analyzer circuitry 702 determines whether at least one condition of the aircraft has changed. If the example flight mode analyzer circuitry 704 and/or the example condition analyzer circuitry 702 determines that the mode and/or the condition has changed (block 810), control of the process returns to block 802. Otherwise, the process ends.

Figure 9:
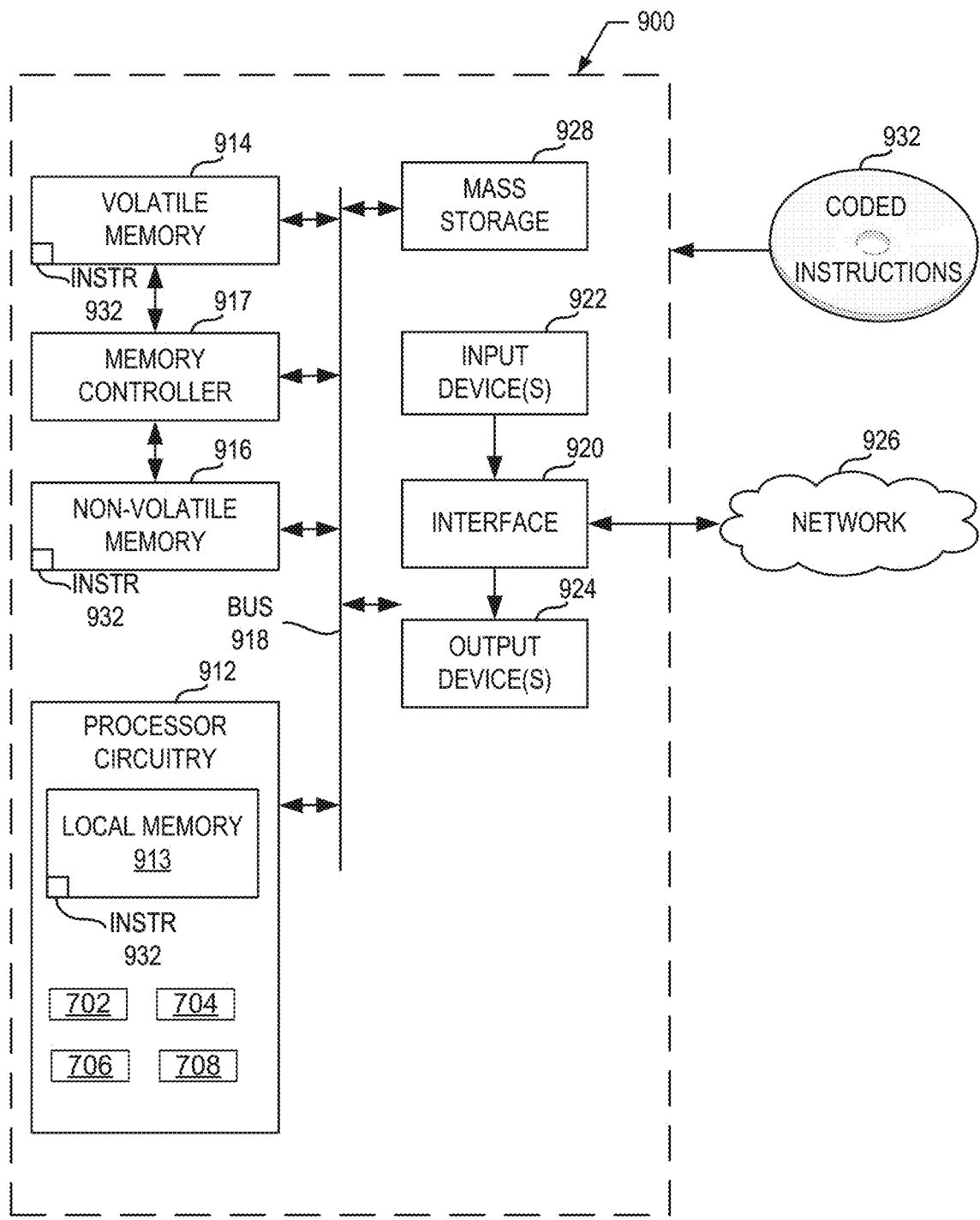
FIG. 9 is a block diagram of an example processing platform including processor circuitry structured to execute the example machine readable instructions and/or the example operations of FIG. 8 to implement the example ducted fan control system of FIG. 7.

FIG. 9 is a block diagram of an example processor platform 900 structured to execute and/or instantiate the machine readable instructions and/or the operations of FIG. 8 to implement the ducted fan controller 700 of FIG. 7. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example condition analyzer circuitry 702, the example flight mode analyzer circuitry 704, the example opening analyzer circuitry 706, and the example flight input analyzer circuitry 708.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIG. 8, may be stored in the mass storage device 928, in the volatile memory 914, in the non-volatile memory 916, and/or on a removable non-transitory computer readable storage medium such as a CD or DVD.

Figure 10:
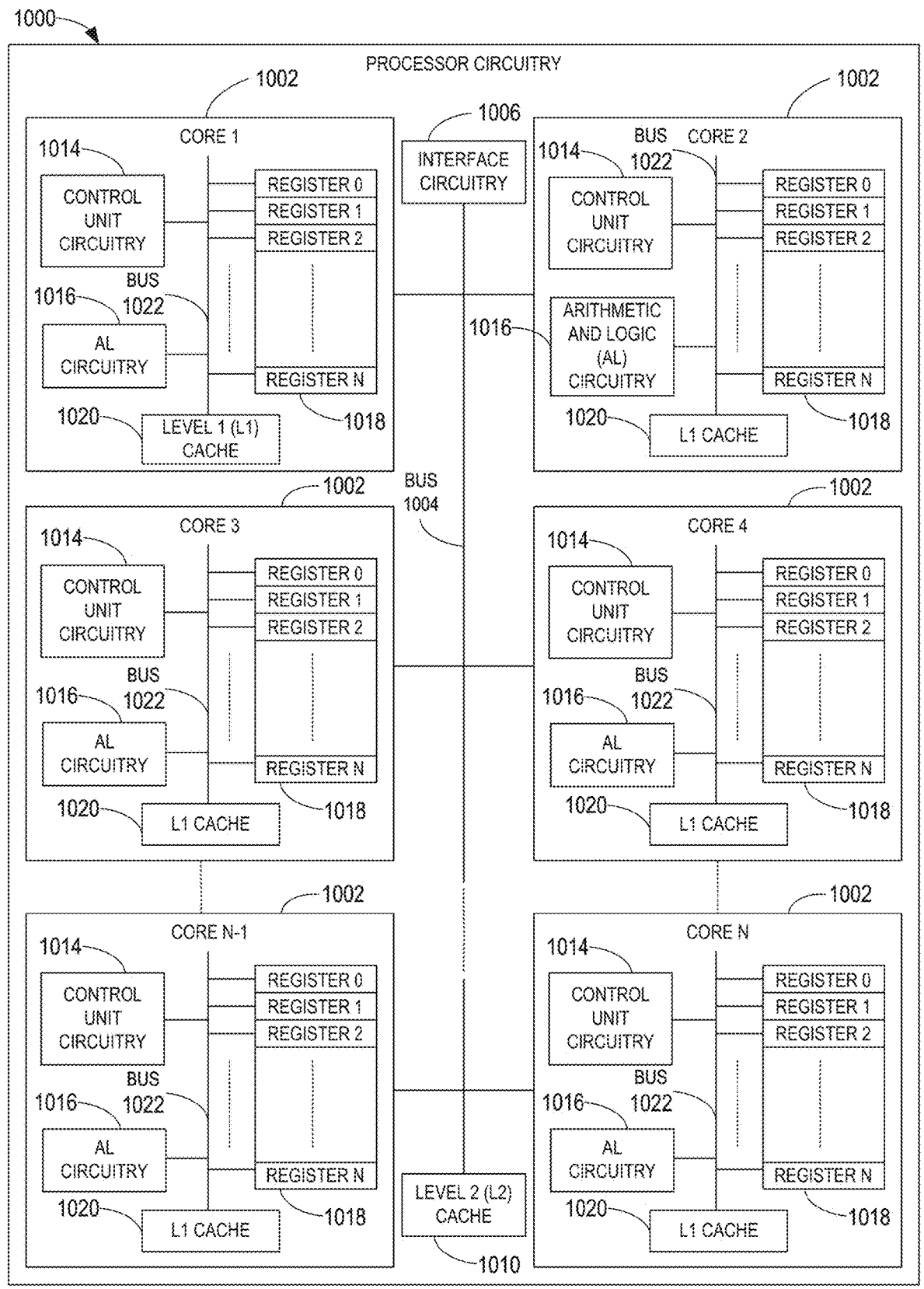
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowchart of FIG. 8 to effectively instantiate the ducted fan controller 700 as logic circuits to perform the operations corresponding to those machine readable instructions. In some such examples, the ducted fan controller 700 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIG. 8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
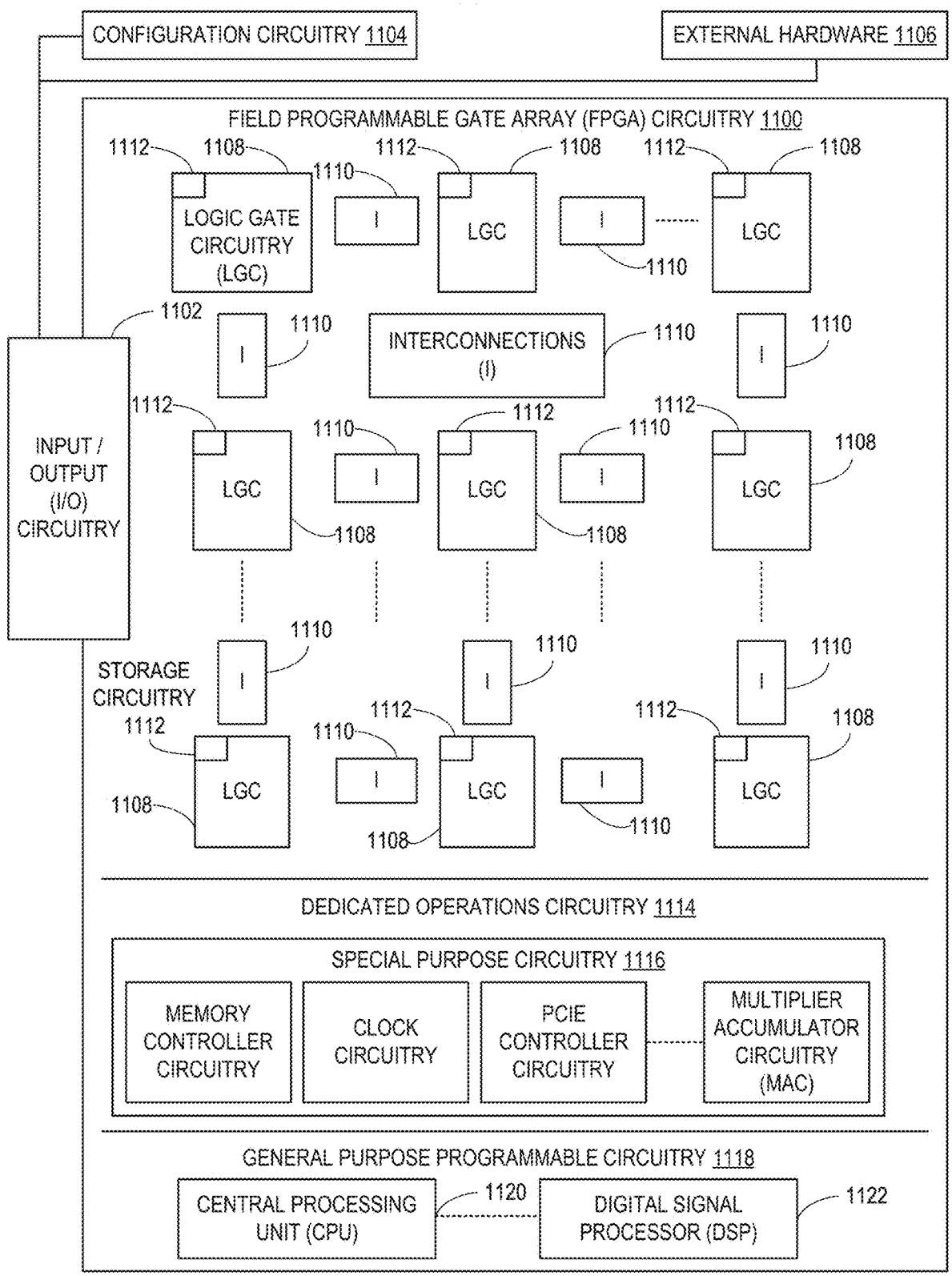
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIG. 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIG. 8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIG. 8. As such, the FPGA circuitry 1100 may be structured to effectively instantiate some or all of the machine readable instructions of the flowchart of FIG. 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIG. 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an onboard CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowchart of FIG. 8 may be executed by one or more of the cores 1002 of FIG. 10, a second portion of the machine readable instructions represented by the flowchart of FIG. 8 may be executed by the FPGA circuitry 1100 of FIG. 6, and/or a third portion of the machine readable instructions represented by the flowchart of FIG. 8 may be executed by an ASIC. It should be understood that some or all of the circuitry of FIG. 7 may, thus, be instantiated at the same or different times. Some or all of the circuitry may be instantiated, for example, in one or more threads executing concurrently and/or in series. Moreover, in some examples, some or all of the circuitry of FIG. 7 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Example methods, apparatus, systems, and articles of manufacture to enableo flow control of ducted fans are disclosed herein. Further examples and combinations thereof include the following:

Example 1 includes a flow control apparatus for use with an aircraft, the apparatus comprising a duct defining an inner cavity with a primary flow path, a fan disposed in the inner cavity, an aperture on an exterior surface of the duct and upstream from the fan, the aperture fluidly coupled to the inner cavity to define a secondary flow path, and a door to control a degree to which the aperture is opened.

Example 2 includes the apparatus as defined in example 1, further including at least one memory, machine readable instructions, and processor circuitry to at least one of instantiate or execute the machine readable instructions to determine at least one of a mode or a condition of the aircraft, determine the degree to which the aperture is to be opened based on the at least one of the mode or the condition of the aircraft, and control the door associated with the aperture based on the determined degree to which the aperture is to be opened.

Example 3 includes the apparatus as defined in example 2, wherein the degree to which the aperture is to be opened is determined based on the mode of the aircraft.

Example 4 includes the apparatus as defined in example 3, wherein the mode corresponds to a hover mode, a transition mode or a cruise mode of the aircraft.

Example 5 includes the apparatus as defined in any of examples 2 to 4, wherein the degree to which the aperture is to be opened is determined based on an airspeed measurement corresponding to the aperture.

Example 6 includes the apparatus as defined in any of examples 1 to 5, wherein the door moves by a pivoting action.

Example 7 includes the apparatus as defined in any of examples 1 to 6, wherein the door moves by a sliding action.

Example 8 includes the apparatus as defined in any of examples 1 to 7, wherein the aperture is fluidly coupled to the inner cavity via a curved channel.

Example 9 includes the apparatus as defined in example 8, wherein the curved channel includes a profile that is swept back from a leading edge side to a trailing edge side.

Example 10 includes a method for supplementing a primary flow path of a propulsive fan of an aircraft, the method comprising operating the fan such that a primary flow path flows through an inner cavity defined by a duct in which the fan is positioned, and at least partially opening an aperture on an external surface of the duct and upstream of the fan to enable a secondary flow path to flow into the inner cavity from the aperture.

Example 11 includes the method as defined in example 10, wherein the aperture is opened in a first flight mode of the aircraft, and wherein the aperture is closed in a second flight mode of the aircraft.

Example 12 includes the method as defined in example 11, wherein the first flight mode corresponds to a hover or vertical takeoff and landing (VTOL) mode of the aircraft, and the second flight mode corresponds to a cruise mode of the aircraft.

Example 13 includes the method as defined in any of examples 10 to 12, further including determining, by executing instructions with processor circuitry, whether the aperture is to be at least partially opened based on at least one of a flight mode or a flight condition of the aircraft.

Example 14 includes the method as defined in example 13, further including determining, by executing instructions with the processor circuitry, a degree to which the aperture is to be opened based on the at least one of the flight mode or the flight condition of the aircraft.

Example 15 includes the method as defined in any of examples 10 to 14, wherein the aperture is at least partially opened by controlling an actuator operatively coupled to a door associated with the aperture.

Example 16 includes a non-transitory machine readable storage medium comprising instructions that, when executed, cause processor circuitry to at least determine at least one of a flight condition or a flight mode associated with an aircraft, and cause, based on the determined at least one of the flight condition or the flight mode, an aperture of a duct defining an inner cavity with a fan disposed therein to at least partially open to reduce flow separation associated with the duct.

Example 17 includes the non-transitory machine readable medium as defined in example 16, wherein the instructions cause the processor circuitry to determine whether the aircraft is in (i) a hover mode or vertical takeoff and landing (VTOL) mode or (ii) in a cruise mode.

Example 18 includes the non-transitory machine readable medium as defined in any of examples 16 or 17, wherein the instructions cause the processor circuitry to determine a degree to which the aperture is to be opened based on the at least one of the flight condition or the flight mode.

Example 19 includes the non-transitory machine readable medium as defined in example 18, wherein the instructions cause the processor circuitry to determine the degree to which the aperture is to be opened based on an airspeed measured at the aperture.

Example 20 includes the non-transitory machine readable medium as defined in any of examples 18 or 19, wherein the instructions cause the processor circuitry to determine the degree to which the aperture is to be opened based on a tilt of a wing of the aircraft relative to a fuselage of the aircraft.

From the foregoing, it will be appreciated that example systems, methods, apparatus, and articles of manufacture have been disclosed that enable flow control of ducted fans for improved operation thereof. Examples disclosed herein can enable more efficient operation of ducted propulsion systems while enabling a wide degree of flexibility for different operational modes and/or operating conditions. Examples disclosed herein can enable reduction of unfavorable flow characteristics and/or patterns present in known ducted fan systems.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent. While examples disclosed herein are shown in the context of ducted fan systems, examples disclosed herein can be applied to any other appropriate flow application and/or vehicle types, including manned or un-manned vehicle types.

What is claimed is:

1. A flow control apparatus for use with an aircraft, the apparatus comprising:
    a duct defining an inner cavity with a primary flow path;
    a fan disposed in the inner cavity;
    an aperture on an exterior surface of the duct and upstream from the fan, the aperture fluidly coupled to the inner cavity to define a secondary flow path; and
    a door to control a degree to which the aperture is opened, wherein the door moves by a sliding action, the door including linkages to enable the door to be pliable as the door slides wherein the linkages are coupled together along a length of the door.

2. The apparatus as defined in claim 1, further including:
    at least one memory;
    machine readable instructions; and
    processor circuitry to at least one of instantiate or execute the machine readable instructions to:
        determine at least one of a mode or a condition of the aircraft,
        determine the degree to which the aperture is to be opened based on the at least one of the mode or the condition of the aircraft, and
        control the door associated with the aperture based on the determined degree to which the aperture is to be opened.

3. The apparatus as defined in claim 2, wherein the degree to which the aperture is to be opened is determined based on the mode of the aircraft.

4. The apparatus as defined in claim 3, wherein the mode corresponds to a hover mode, a transition mode or a cruise mode of the aircraft.

5. The apparatus as defined in claim 2, wherein the degree to which the aperture is to be opened is determined based on an airspeed measurement corresponding to the aperture.

6. The apparatus as defined in claim 1, wherein the door further moves by a pivoting action.

7. The apparatus as defined in claim 1, wherein the aperture is fluidly coupled to the inner cavity via a curved channel.

8. The apparatus as defined in claim 7, wherein the curved channel includes a profile that is swept back from a leading edge side to a trailing edge side.

9. The apparatus as defined in claim 1, wherein the door is at least partially foldable for fitting into an opening of an external skin of the aircraft.

10. The apparatus as defined in claim 1, wherein the door is pliable to align with an external skin to enable the door to fit into an opening corresponding to the exterior surface of the aircraft.

11. The apparatus as defined in claim 10, wherein the opening corresponds to an internal slot corresponding to the exterior surface.

12. A method for supplementing a primary flow path of a propulsive fan of an aircraft, the method comprising:
operating the fan such that the primary flow path flows through an inner cavity defined by a duct in which the fan is positioned; and
at least partially opening, via a door, an aperture on an external surface of the duct and upstream of the fan to enable a secondary flow path to flow into the inner cavity from the aperture, wherein the door moves by a sliding action, the door including linkages to enable the door to be pliable as the door slides wherein the linkages are coupled together along a length of the door.

13. The method as defined in claim 12, wherein the aperture is opened in a first flight mode of the aircraft, and wherein the aperture is closed in a second flight mode of the aircraft.

14. The method as defined in claim 13, wherein the first flight mode corresponds to a hover or vertical takeoff and landing (VTOL) mode of the aircraft, and the second flight mode corresponds to a cruise mode of the aircraft.

15. The method as defined in claim 12, further including determining, by executing instructions with processor circuitry, whether the aperture is to be at least partially opened based on at least one of a flight mode or a flight condition of the aircraft.

16. The method as defined in claim 15, further including determining, by executing instructions with the processor circuitry, a degree to which the aperture is to be opened based on the at least one of the flight mode or the flight condition of the aircraft.

17. The method as defined in claim 12, wherein the aperture is at least partially opened by controlling an actuator operatively coupled to the door.

18. A non-transitory machine readable storage medium comprising instructions that, when executed, cause processor circuitry to at least:
determine at least one of a flight condition or a flight mode associated with an aircraft; and
cause, based on the determined at least one of the flight condition or the flight mode, an aperture of a duct defining an inner cavity with a fan disposed therein to at least partially open by controlling a door to reduce flow separation associated with the duct, wherein the door moves by a sliding action, the door including linkages to enable the door to be pliable as the door slides wherein the linkages are coupled together along a length of the door.

19. The non-transitory machine readable medium as defined in claim 18, wherein the instructions cause the processor circuitry to determine whether the aircraft is in (i) a hover mode or vertical takeoff and landing (VTOL) mode or (ii) a cruise mode.

20. The non-transitory machine readable medium as defined in claim 18, wherein the instructions cause the processor circuitry to determine a degree to which the aperture is to be opened based on the at least one of the flight condition or the flight mode.

21. The non-transitory machine readable medium as defined in claim 20, wherein the instructions cause the processor circuitry to determine the degree to which the aperture is to be opened based on an airspeed measured at the aperture.

22. The non-transitory machine readable medium as defined in claim 20, wherein the instructions cause the processor circuitry to determine the degree to which the aperture is to be opened based on a tilt of a wing of the aircraft relative to a fuselage of the aircraft.

* * * * *